US012421888B2

(12) United States Patent
Delahanty et al.

(10) Patent No.: US 12,421,888 B2
(45) Date of Patent: Sep. 23, 2025

(54) MULTI-CORE HEAT RECOVERY CHARGE COOLER

(71) Applicant: CUMMINS INC., Columbus, IN (US)

(72) Inventors: Jared Carpenter Delahanty, Morgantown, IN (US); Timothy C. Ernst, Columbus, IN (US); Achyut Paudel, Columbus, IN (US)

(73) Assignee: Cummins Inc., Columbus, IN (US)

( * ) Notice: Subject to any disclaimer, the term of this patent is extended or adjusted under 35 U.S.C. 154(b) by 97 days.

(21) Appl. No.: 17/910,278

(22) PCT Filed: Mar. 15, 2021

(86) PCT No.: PCT/US2021/022301
§ 371 (c)(1),
(2) Date: Sep. 8, 2022

(87) PCT Pub. No.: WO2021/194777
PCT Pub. Date: Sep. 30, 2021

(65) Prior Publication Data
US 2023/0117810 A1 Apr. 20, 2023

Related U.S. Application Data

(60) Provisional application No. 62/993,253, filed on Mar. 23, 2020.

(51) Int. Cl.
*F02B 29/04* (2006.01)
*F01P 7/14* (2006.01)
*F02G 5/02* (2006.01)

(52) U.S. Cl.
CPC ............ *F02B 29/0462* (2013.01); *F01P 7/14* (2013.01); *F02G 5/02* (2013.01); *F01P 2007/146* (2013.01)

(58) Field of Classification Search
CPC .............. F02B 29/0462; F02B 29/0412; F02B 29/0437; F02B 29/0443; F01P 7/14;
(Continued)

(56) References Cited

U.S. PATENT DOCUMENTS 4,317,439 A * 3/1982 Emmerling ............... F01P 3/20
60/599
6,491,001 B1 12/2002 Dean et al.
(Continued)

FOREIGN PATENT DOCUMENTS

| CN | 109154227 A | 1/2019 |
| JP | 6281322 | 10/1994 |

(Continued)

OTHER PUBLICATIONS

International Search Report and Written Opinion for PCT Application No. PCT/US2021/022301, dated Jun. 14, 2021.
(Continued)

Primary Examiner — Matthew T Largi
(74) Attorney, Agent, or Firm — Foley & Lardner LLP

(57) ABSTRACT

A waste heat recovery system for an engine system includes a first charge air cooler in communication with a working fluid path of the waste heat recovery system. The first charge air cooler includes a first waste heat recovery core and a first cooling fluid core. The first waste heat recovery core includes a first working fluid inlet configured to receive a working fluid from the working fluid path. The first working fluid conduit is coupled to the first working fluid inlet and a first working fluid outlet. The first cooling fluid core includes a first cooling fluid inlet in fluid communication with a cooling fluid source and a first cooling fluid conduit fluidly coupled to the first cooling fluid inlet and a first cooling fluid outlet. The first cooling fluid conduit is con-
(Continued)

figured to direct cooling fluid from the first cooling fluid inlet to the first cooling fluid outlet.

28 Claims, 6 Drawing Sheets

(58) Field of Classification Search
CPC .... F01P 2007/146; F02G 5/02; F01K 23/065; F01K 23/06; F01K 23/10; F01N 2900/08
See application file for complete search history.

(56) References Cited

U.S. PATENT DOCUMENTS

| | | | |
|---|---|---|---|
| 6,523,603 B2 * | 2/2003 | Uchikawa | F28D 1/05383 165/149 |
| 7,013,644 B2 | 3/2006 | Radcliff et al. | |
| 7,380,544 B2 * | 6/2008 | Raduenz | F28D 9/0056 165/166 |
| 7,721,543 B2 | 5/2010 | Massey et al. | |
| 8,302,399 B1 | 11/2012 | Freund et al. | |
| 8,434,307 B2 * | 5/2013 | Ambros | F02B 29/0443 60/624 |
| 8,561,405 B2 | 10/2013 | Ast et al. | |
| 8,650,879 B2 | 2/2014 | Freund et al. | |
| 2003/0075307 A1 * | 4/2003 | Stoynoff | F28F 1/126 165/135 |
| 2008/0264609 A1 * | 10/2008 | Lutz | F02M 26/32 165/104.19 |
| 2010/0139626 A1 | 6/2010 | Raab et al. | |
| 2011/0139131 A1 * | 6/2011 | Kardos | F02B 29/0412 123/542 |
| 2011/0315130 A1 * | 12/2011 | Kardos | F01N 3/2006 123/568.12 |
| 2012/0285169 A1 | 11/2012 | Freund et al. | |
| 2013/0068202 A1 * | 3/2013 | Kardos | F01P 7/165 123/563 |
| 2015/0040541 A1 | 2/2015 | Dane | |
| 2015/0369179 A1 * | 12/2015 | Hotta | F02M 26/24 60/599 |
| 2016/0356205 A1 * | 12/2016 | Braun | F02M 35/10268 |
| 2017/0335745 A1 | 11/2017 | Benjamin et al. | |
| 2018/0051652 A1 | 2/2018 | Filippone | |
| 2018/0238197 A1 | 8/2018 | Seo | |
| 2018/0355765 A1 * | 12/2018 | Patel | F02B 29/04 |
| 2018/0372023 A1 | 12/2018 | Wu et al. | |
| 2019/0003419 A1 * | 1/2019 | Patel | F02G 5/04 |
| 2019/0234343 A1 | 8/2019 | Park et al. | |
| 2019/0249589 A1 | 8/2019 | Ernst et al. | |
| 2020/0191020 A1 * | 6/2020 | Delahanty | F01P 5/10 |
| 2022/0356858 A1 * | 11/2022 | Haaland | F02M 35/10222 |
| 2023/0347705 A1 * | 11/2023 | Koshijima | F01P 3/20 |

FOREIGN PATENT DOCUMENTS

| | | | | |
|---|---|---|---|---|
| WO | WO-02/090739 | | 11/2002 | |
| WO | WO-2017/105480 A1 | | 6/2017 | |
| WO | WO-2018147867 A1 * | | 8/2018 | F01D 1/023 |
| WO | WO-2018/213080 | | 11/2018 | |

OTHER PUBLICATIONS

EP Search Report for EP Application No. 22202514.0, dated Feb. 22, 2023.

Office Action for CN Application 202180022983.7, dated Mar. 7, 2025.

* cited by examiner

MULTI-CORE HEAT RECOVERY CHARGE COOLER

CROSS-REFERENCE TO RELATED PATENT APPLICATIONS

The present application is the U.S. National Phase of PCT Application No. PCT/US2021/022301, filed Mar. 15, 2021, which claims priority to U.S. Provisional Application No. 62/993,253, filed Mar. 23, 2020, the entire contents of which are incorporated herein by reference.

TECHNICAL FIELD

The present disclosure relates generally to the field of waste heat recovery ("WHR") systems for engine systems.

BACKGROUND

During operation, internal combustion engines discharge heat energy into the external environment through exhaust gas, engine cooling systems, charge air cooling systems, etc. The discharged heat energy that is not used to perform useful work may be referred to as "waste heat." WHR systems capture a portion of the waste heat to perform useful work. Some WHR systems utilize a Rankine cycle. The Rankine cycle is a thermodynamic process in which heat is transferred to a working fluid in a Rankine cycle circuit. The working fluid is pumped to a heat exchanger where it is vaporized. The vapor is passed through an expander and then through a condenser, where the vapor is condensed back to a fluid. The expanding working fluid vapor causes the expander to rotate, thereby converting the waste heat energy to mechanical energy. The mechanical energy may be transmitted to engine system components, such as a pump, a compressor, a generator, etc.

The waste heat can be in the form of hot charge gases exiting a compressor on a turbocharger. To extract heat from the charge gases, a charge air cooler ("CAC") can be used. A charge cooler provides for heat to be exchanged between the charge gases and a working fluid (e.g., a coolant, a refrigerant, etc.) such that heat is transferred from the charge gases to the working fluid. Because the charge gases may be routed back to an intake manifold of the engine, cooling the charge gases to a temperature at which the engine operates efficiently is desirable. However, in some instances a charge cooler with a single core does not provide sufficient cooling to reduce the temperature of the charge gases to a desirable temperature.

SUMMARY

In one set of embodiments, a waste heat recovery system for an engine system includes a first charge air cooler in fluid communication with a working fluid path of the waste heat recovery system. The first charge air cooler includes a first waste heat recovery core and a first cooling fluid core. The first waste heat recovery core includes a first working fluid inlet configured to receive a working fluid from the working fluid path. The first working fluid conduit is fluidly coupled to the first working fluid inlet and a first working fluid outlet, and the first working fluid conduit is configured to direct the working fluid from the first working fluid inlet to the first working fluid outlet. A first air conduit is adjacent to the first working fluid conduit and is in fluid communication with a first air inlet and a first air outlet. The first air conduit is configured to direct air from the first air inlet to the first air outlet, and the first air inlet is in fluid communication with an air source. The first cooling fluid core includes a first cooling fluid inlet in fluid communication with a cooling fluid source and a first cooling fluid conduit fluidly coupled to the first cooling fluid inlet and a first cooling fluid outlet. The first cooling fluid conduit is configured to direct cooling fluid from the first cooling fluid inlet to the first cooling fluid outlet. A second air conduit is adjacent to the first cooling fluid conduit and is in fluid communication with a second air inlet and a second air outlet. The second air conduit is configured to direct air from the second air inlet to the second air outlet. The second air inlet is in fluid communication with the first air outlet, and the second air outlet is in fluid communication with an intake of an engine or a compressor inlet of the engine.

In another set of embodiments, an engine system is provided. The engine system comprises a waste heat recovery system. The waste heat recovery system comprises a first charge air cooler in fluid communication with a first working fluid path, a first cooling fluid path, and an air source. The waste heat recovery system further comprises a second charge air cooler is in fluid communication with a second working fluid path, a second cooling fluid path, and the air source. The waste heat recovery system further comprises a first flow control valve selectively directs a portion of a working fluid through the first working fluid path and the remainder of the working fluid through the second working fluid path.

In yet another set of embodiments, a waste heat recovery system for an engine system includes a first charge air cooler in fluid communication with a working fluid path and a source of compressed air. The first charge air cooler is configured to direct the compressed air from a first air inlet to a first air outlet and to direct a working fluid from a first working fluid inlet to a first working fluid outlet. A second charge air cooler is in fluid communication with the working fluid path and the source of compressed air and is configured to direct the compressed air from a second air inlet to a second air outlet and to direct the working fluid from a second working fluid inlet to a second working fluid outlet. The second air inlet is in fluid communication with the first air outlet and the second working fluid inlet is in fluid communication with the first working fluid outlet. A third charge air cooler is in fluid communication with a cooling fluid path and the source of compressed air and is configured to direct the compressed air from a third air inlet to a third air outlet and to direct a cooling fluid from a first cooling fluid inlet to a first cooling fluid outlet. The third air inlet is in fluid communication with the second air outlet, and the third air outlet is in communication with an intake of the engine system.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION

Following below are more detailed descriptions of various concepts related to, and implementations of, methods, apparatuses, and systems for cooling charge air using a charge air cooler with multiple cores. The various concepts introduced above and discussed in greater detail below may be implemented in any of numerous ways, as the described concepts are not limited to any particular manner of implementation. Examples of specific implementations and applications are provided primarily for illustrative purposes.

I. Overview

A WHR system recovers heat energy that would otherwise be lost from a vehicle component or system, such as from an internal combustion engine of the vehicle. The more waste heat energy that is extracted from the component or system by a WHR system, the greater the potential efficiency of the engine. In other words, rather than the extracted heat being lost, the extracted heat energy may be repurposed to, e.g., supplement the power output from the internal combustion engine, thereby increasing the efficiency of the system.

Implementations herein relate to various WHR systems that incorporate CACs with multiple cores as part of the WHR system. A CAC receives charge air from a compressor of a turbocharger (or other air-handling component, such as a supercharger, e-compressor, etc.), cools the charge air, and provides the charge air to an intake manifold of the engine. The heat that is removed from the charge air is used as part of the WHR system and converted to mechanical energy to provide useful work. A CAC that includes multiple cores is capable of cooling the charge air to a lower temperature than a CAC with a single core. Providing the charge air to the intake manifold at a lower temperature can increase the efficiency of the engine. Additionally, a multi-core CAC may better utilize the available thermal energy of the charge gas to increase the power output or efficiency of the WHR system.

II. Dual Core CAC System

Figure 1:
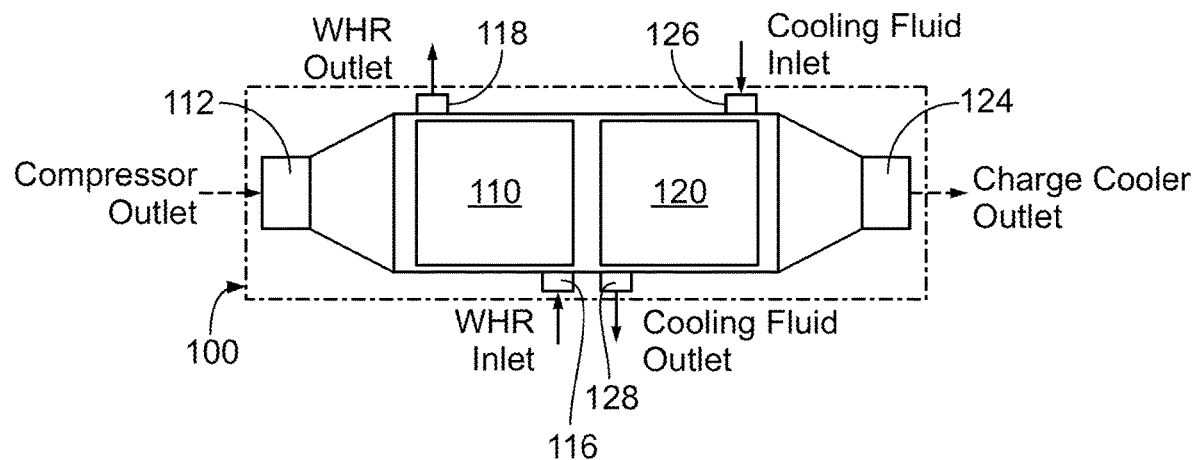
FIGS. 1-2 are illustrations of a dual-core CAC and a WHR system incorporating the dual-core CAC, according to a particular embodiment.
Figure 2:
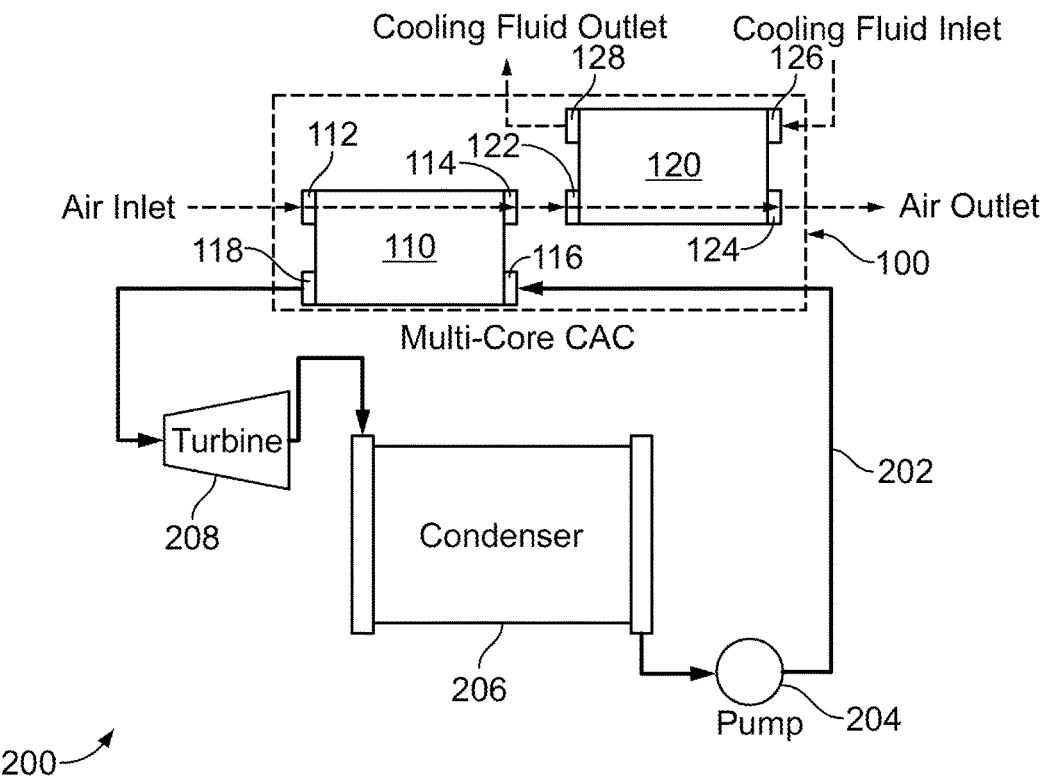

FIGS. 1-2 are illustrations of a multi-core CAC 100 and a WHR system 200 incorporating the multi-core CAC 100, respectively. The multi-core CAC 100 includes a WHR core 110 in fluid communication with a cooling fluid core 120.

The WHR core 110 includes a first air inlet 112, a first air outlet 114, a working fluid inlet 116, and a working fluid outlet 118. In some embodiments, the WHR core 110 is structured similarly to a heat exchanger. In such embodiments, charge air enters the WHR core 110 from a compressor of a turbocharger via the first air inlet 112 and is directed to the first air outlet 114 via a first air conduit (not shown) that couples the first air inlet 112 to the first air outlet 114. The charge air enters the first air inlet 112 at an elevated temperature (e.g., approximately 150-200 degrees Fahrenheit). Working fluid enters the WHR core 110 via the working fluid inlet 116 and is directed to the working fluid outlet 118 via a working fluid conduit (not shown) that couples the working fluid inlet 116 to the working fluid outlet 118. The working fluid can be any type of fluid capable of absorbing heat. Examples of the working fluid include, but are not limited to, coolants, refrigerants, high molecular mass fluids, etc. In some arrangements, the first air conduit and the working fluid conduit are adjacent to each other such that at least some heat from the charge air is absorbed by the working fluid, thereby decreasing the temperature of the charge air and increasing the temperature of the working fluid.

The working fluid is directed around a working fluid path 202, which includes the working fluid conduit of the WHR core 110. After exiting the working fluid outlet 118, the working fluid enters a turbine 208, where the heat of working fluid is converted to mechanical energy by the turbine 208. The working fluid continues to a condenser 206 that lowers the temperature of the working fluid, and the working fluid is pumped back through the WHR core 110 by a pump 204.

In some implementations, the temperature of the charge air exiting the WHR core 110 may be above a target intake temperature for the engine. For example, the temperature of the charge air exiting the WHR core 110 may be approximately one hundred degrees Fahrenheit, while the target intake temperature may be between approximately fifty degrees and seventy degrees Fahrenheit. Accordingly, the charge air is directed through the cooling fluid core 120 to further reduce the temperature of the charge air.

The cooling fluid core 120 includes a second air inlet 122, a second air outlet 124, a cooling fluid inlet 126, and a cooling fluid outlet 128. In some embodiments, the cooling fluid core 120 is structured similarly to a heat exchanger. In such embodiments, the charge air enters the cooling fluid core 120 from the first air outlet 114 via the second air inlet 122 and is directed to the second air outlet 124 via a second air conduit (not shown) that couples the second air inlet 122 to the second air outlet 124. Cooling fluid enters the cooling fluid core 120 via the cooling fluid inlet 126 and is directed to the cooling fluid outlet 128 via a cooling fluid conduit (not shown) that couples the cooling fluid inlet 126 to the cooling fluid outlet 128. The cooling fluid flowing through the cooling fluid core 120 can be any type of cooling fluid including, but not limited to, coolant, refrigerant, water, etc.

In some arrangements where the cooling fluid is water, the temperature of the water at the cooling fluid inlet 126 is approximately thirty-five to forty-five degrees Fahrenheit. In some arrangements, the second air conduit and the cooling fluid conduit are adjacent to each other such that at least some heat from the charge air is absorbed by the water, thereby decreasing the temperature of the charge air and increasing the temperature of the water. For example, the temperature of the water at the cooling fluid outlet 128 may be approximately fifty to sixty degrees Fahrenheit and the temperature of the charge air at the second air outlet 124 may be approximately fifty-five to sixty-five degrees Fahrenheit. In some embodiments, the temperature of the charge air at the second air outlet 124 may be approximately equal to the ambient temperature around the vehicle (e.g., the temperature of the charge air may be within plus or minus ten degrees Fahrenheit of the ambient temperature).

Arranged in the manner described, the multi-core CAC 100 is configured to reduce the temperature of the charge air exiting the multi-core CAC 100 to a target intake temperature (in some embodiments, the target intake temperature is a temperature approximately equal to the ambient temperature) for the intake of the engine. Providing air to the engine at the target intake temperature reduces the amount of work the engine must do to combat the effects of higher temperatures (e.g., less available oxygen for combustion, engine knocking, etc.), thereby increasing the efficiency or otherwise improving the performance or operation of the engine.

The sizes of the WHR core 110 and the cooling fluid core 120 can be optimized based on various target characteristics. These characteristics can include power output from the WHR system 200, the target intake temperature, and other characteristics associated with a WHR system. In some embodiments, the WHR core 110 may be sized to extract more heat from the charge air than a conventional WHR system such that the temperature of the working fluid entering the turbine is higher than that of a conventional WHR system. This arrangement allows the turbine to convert the higher temperature working fluid to more mechanical work than in a conventional WHR system. In various arrangements, the WHR core 110 and/or the cooling fluid core 120 may be sized to optimize the temperature of the air at the second air outlet 124 such that the air enters the intake manifold at a temperature ideal for engine performance.

In various embodiments, the charge air entering the WHR core 110 may be compressed by a single compressor or by multiple compressors such that the charge air is compressed in stages.

In some arrangements, an intermediate fluid may be used to transfer heat from the air to the working fluid. In such arrangements, additional inputs and/or outputs may be included in the WHR core 110 and/or the cooling fluid core 120 such that heat is transferred from the air to the intermediate fluid, and from the intermediate fluid to the working fluid.

In some instances, the WHR core 110 and the cooling fluid core 120 are independently operable such that each core can remain functional in the event that the other core experiences a failure. For example, if the cooling fluid core 120 fails (e.g., the cooling fluid stops flowing through the cooling fluid core 120 or the cooling fluid flowing through the cooling fluid core 120 is not at the appropriate temperature), operation of the WHR core 110 can be modified so as to absorb additional heat from the charge air to cool the charge air to an acceptable level and avoid a system failure. In one embodiment, a controller in communication with the WHR system 200 may cause the pump 204 to increase or decrease the flowrate of working fluid such that the working fluid absorbs additional heat from the charge air. The controller may also cause the condenser 206 to lower the temperature of the working fluid entering the pump 204 such that the working fluid can absorb additional heat from the charge air.

Conversely, if the WHR core 110 fails (e.g., the working fluid stops flowing through the WHR core 110 or the working fluid flowing through the WHR core 110 is not at the appropriate temperature), operation of the cooling fluid core 120 can be modified to absorb additional heat from the charge air to cool the charge air to an acceptable level and avoid a system failure. In such instances, the controller may cause the flow of cooling fluid to increase or decrease such that the cooling fluid absorbs additional heat from the charge air. The controller may also cause the temperature of the cooling fluid entering the cooling fluid core 120 to decrease such that the cooling fluid can absorb additional heat from the charge air.

In some embodiments, the multi-core CAC 100 includes various flow control devices (e.g., bypass valves, flow control valves, pumps, etc.) to manage the flow of one or more of the charge air, working fluid, or cooling fluid. For example, a first valve may control the flow of the working fluid such that a flowrate of the working fluid can be set to a desired rate. A second valve may control the flow of the cooling fluid such that a flowrate of the cooling fluid can be set to a desired rate. A third valve may control the flow of charge air such that a flowrate of the charge air can be set to a desired rate. The flowrates of each of the working fluid, cooling fluid, and charge air can be adjusted using the valves to optimize operation of the WHR system 200. Accordingly, using one or more valves, alone or in combination, can isolate one or more cores from other cores.

As shown in FIG. 2, the charge air is in counterflow with both the working fluid and the cooling fluid (e.g., the charge air flows in one direction and the working fluid and cooling fluid flow in the opposite direction). However, in various embodiments any of the fluids described may be in various flow arrangements with the other fluids. Examples of flow arrangements include counterflow, co-flow (e.g., fluids flow in the same direction), cross-flow (e.g., fluids flow in a non-parallel arrangement), or any combination thereof.

Various embodiments described in the present disclosure above should not be construed as limited to a particular arrangement. For instance, the various embodiments and alternatives described above may apply to any of the embodiments subsequently described below.

III. Two Stage Dual Core CAC System

Figure 3:
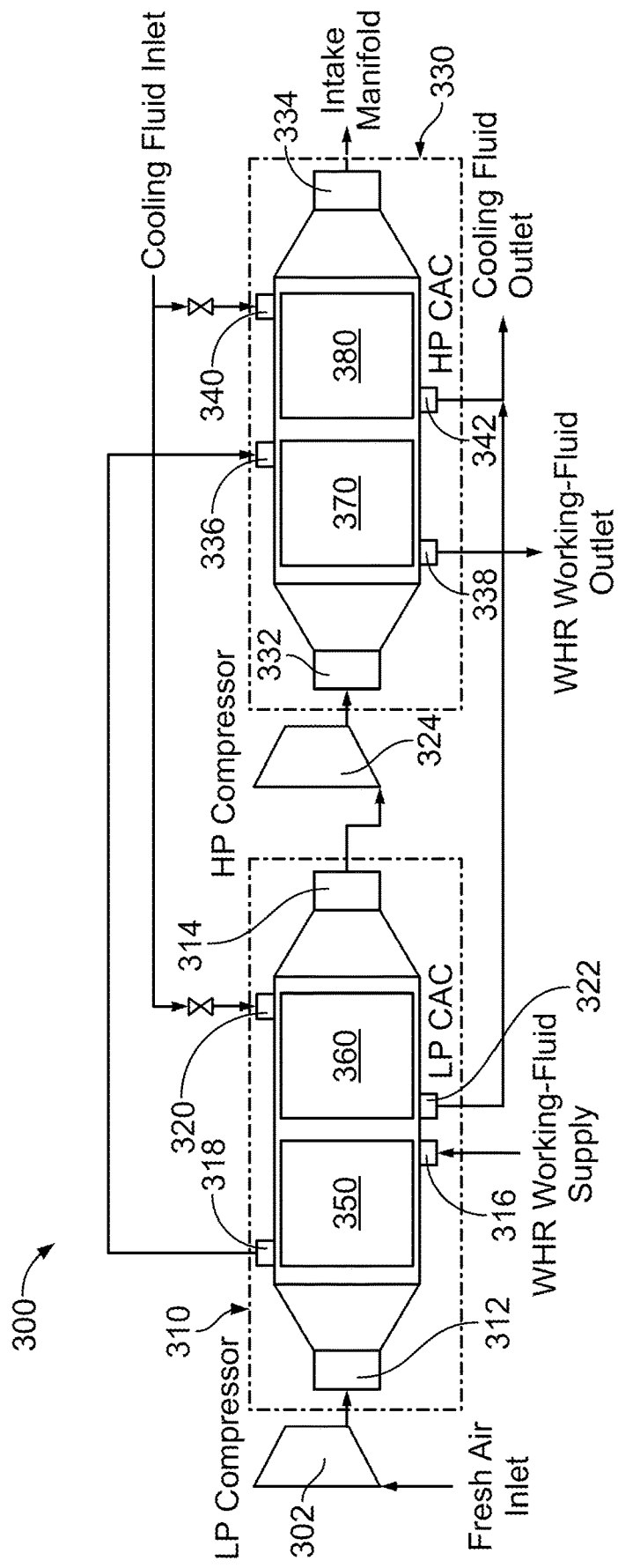
FIG. 3 is an illustration of a two stage dual core CAC system, according to a particular embodiment.

FIG. 3 is an illustration of a two stage dual core CAC system 300, according to a particular embodiment. The two stage dual core CAC system 300 includes a low pressure dual core CAC 310 in fluid communication with a high pressure dual core CAC 330.

The low pressure dual core CAC 310 includes a first WHR core 350 and a first cooling fluid core 360 and is structured similarly to the multi-core CAC 100. The first WHR core 350 includes a first air inlet 312 and a first air outlet (not shown) coupled by a first air conduit (not shown). A first working fluid inlet 316 and a first working fluid outlet 318 are coupled by a first working fluid conduit (not shown). The first cooling fluid core 360 includes a second air inlet (not shown) and a second air outlet 314 coupled by a second air conduit (not shown), and a first cooling fluid inlet 320 coupled to a first cooling fluid outlet 322 by a first cooling fluid conduit (not shown). In some embodiments, air enters the first air inlet 312 after being compressed by a low pressure compressor 302. However, the air can enter the first air inlet 312 directly (e.g., without first being compressed the by low pressure compressor 302). The low pressure dual core CAC 310 is structured similarly to, and operates similarly to, the multi-core CAC 100 in that the charge air enters the first air inlet 312 at an elevated temperature and is cooled via interactions with both the working fluid of the first WHR core 350 and the first cooling fluid core 360 such that the temperature of the charge air is lower at the second air outlet 314 than at the first air inlet 312.

After exiting the low pressure dual core CAC 310 via the second air outlet 314, the charge air is directed to the high pressure dual core CAC 330 via the high pressure compressor 324. The high pressure dual core CAC 330 includes a second WHR core 370 and a second cooling fluid core 380. The second WHR core 370 includes a third air inlet 332 and a third air outlet (not shown) coupled by a third air conduit (not shown). A second working fluid inlet 336 and a second working fluid outlet 338 are coupled by a second working fluid conduit (not shown). The second working fluid inlet 336 is coupled to the first working fluid outlet 318 such that the working fluid exiting the first WHR core 350 is directed to the second WHR core 370. The second cooling fluid core 380 includes a fourth air inlet (not shown) and a fourth air outlet 334 coupled by a fourth air conduit (not shown), and a second cooling fluid inlet 340 coupled to a second cooling fluid outlet 342 by a second cooling fluid conduit (not shown). The high pressure dual core CAC 330 is structured similarly to, and operates similarly to, the multi-core CAC 100 in that the charge air enters the third air inlet 332 at an elevated temperature and is cooled via interactions with both the working fluid of the second WHR core 370 and the second cooling fluid core 380 such that the temperature of the charge air is lower at the fourth air outlet 334 than at the third air inlet 332 and is at the target intake temperature.

In some embodiments, a cooling fluid supply provides a cooling fluid (e.g., water, coolant, refrigerant, etc.) to the first cooling fluid inlet 320 and the second cooling fluid inlet 340 such that the temperature of the fluid in the first cooling fluid core 360 is substantially the same as the temperature in the second cooling fluid core 380. In various arrangements a first valve may be in fluid communication with the first cooling fluid inlet 320, and a second valve may be in fluid communication with the second cooling fluid inlet 340. The first valve and the second valve may be operated independently of each other such that the flow of cooling fluid from the cooling fluid supply can be directed to both of the first cooling fluid core 360 and the second cooling fluid core 380, only one of the first cooling fluid core 360 and the second cooling fluid core 380, or neither of the first cooling fluid core 360 and the second cooling fluid core 380, as desired. Operation of the first valve and the second valve may be based on the temperature of the charge air at the fourth air outlet 334. For example, if the temperature of the charge air at the fourth air outlet 334 is lower than the target intake temperature, one or both of the first valve and the second valve may be used to stop the flow of cooling fluid to increase the temperature of the charge air to the target intake temperature.

The second air outlet 314 is fluidly coupled to a third air inlet 332 such that the charge air is directed from the second air outlet 314 to the third air inlet 332. In some embodiments, the charge air is directed through a high pressure compressor 324 to compress the charge air, thereby increasing the temperature of the charge air. In some arrangements, the charge air is directed to the third air inlet 332 without being compressed by the high pressure compressor 324.

Figure 4:
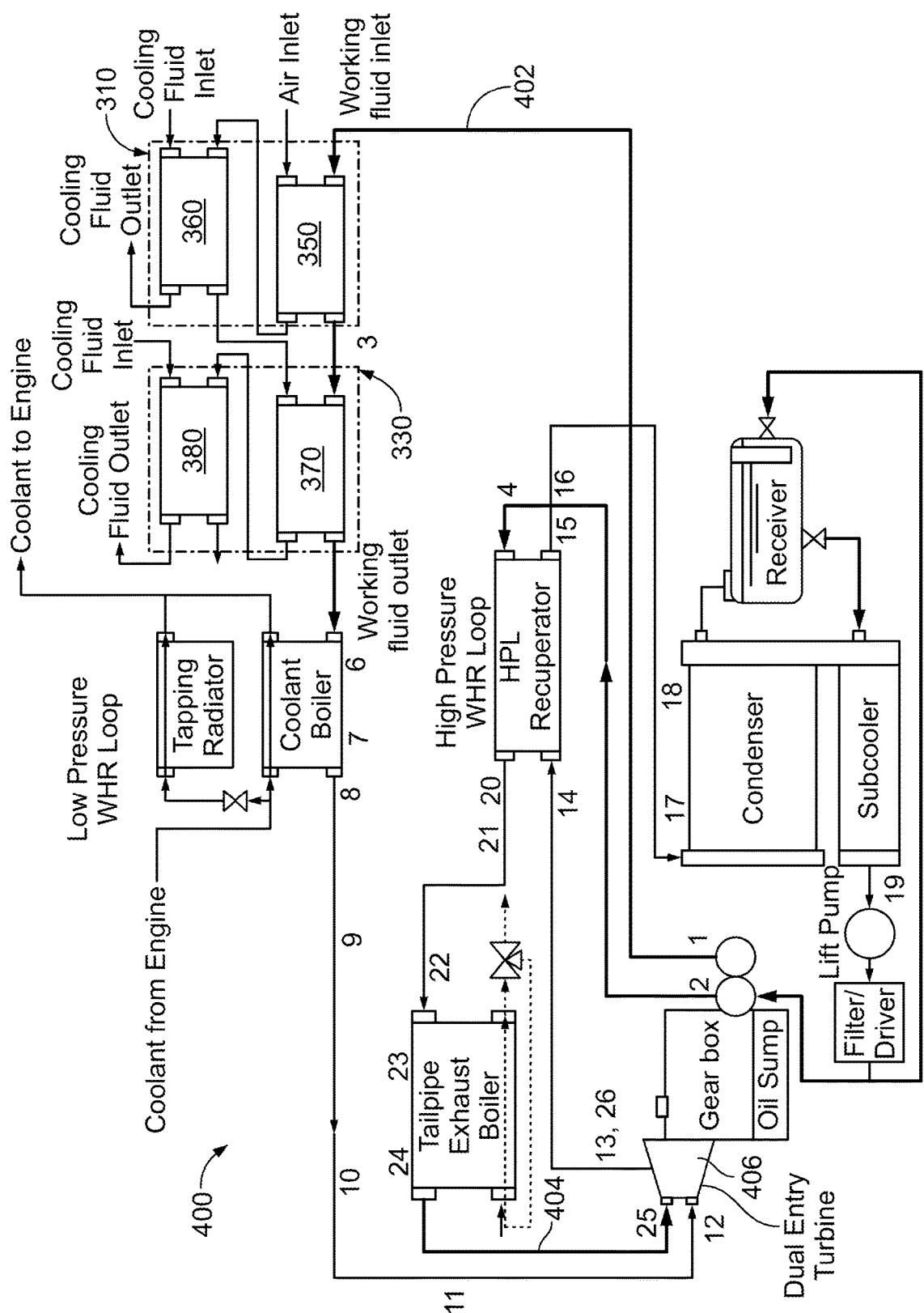
FIG. 4 is an illustration of a WHR system 400 that incorporates the two stage dual core CAC system 300 in series, according to a particular embodiment.

FIG. 4 is an illustration of a WHR system 400 that incorporates the two stage dual core CAC system 300 in series, according to a particular embodiment. As shown, the WHR system 400 includes a low pressure working fluid path 402 and a high pressure working fluid path 404. The low pressure working fluid path 402 is configured to receive heat from sources that are typically at a relatively low temperature (e.g., fifty to one hundred fifty degrees Celsius) compared to the sources used on the high pressure working fluid path 404, and is in fluid communication with the two stage dual core CAC system 300, which is arranged in series. A series arrangement refers to the flow of the working fluid in the low pressure working fluid path 402, in that the working fluid passes through the first WHR core 350 and then the second WHR core 370 before being directed to a dual inlet turbine 406.

The high pressure working fluid path 404 is configured to receive heat from exhaust gas or other type of fluid or gas at a pressure that is higher than that of the heat sources used in the low pressure working fluid path 402.

The working fluid from the low pressure working fluid path 402 and the working fluid from the high pressure working fluid path 404 are both directed to the dual inlet turbine 406, which includes a first inlet in fluid communication with the low pressure working fluid path 402 and a second inlet in fluid communication with the high pressure working fluid path 404. The dual inlet turbine 406 is configured to receive both low pressure working fluid and high pressure working fluid and covert the thermal energy of those working fluids to mechanical work.

Figure 5:
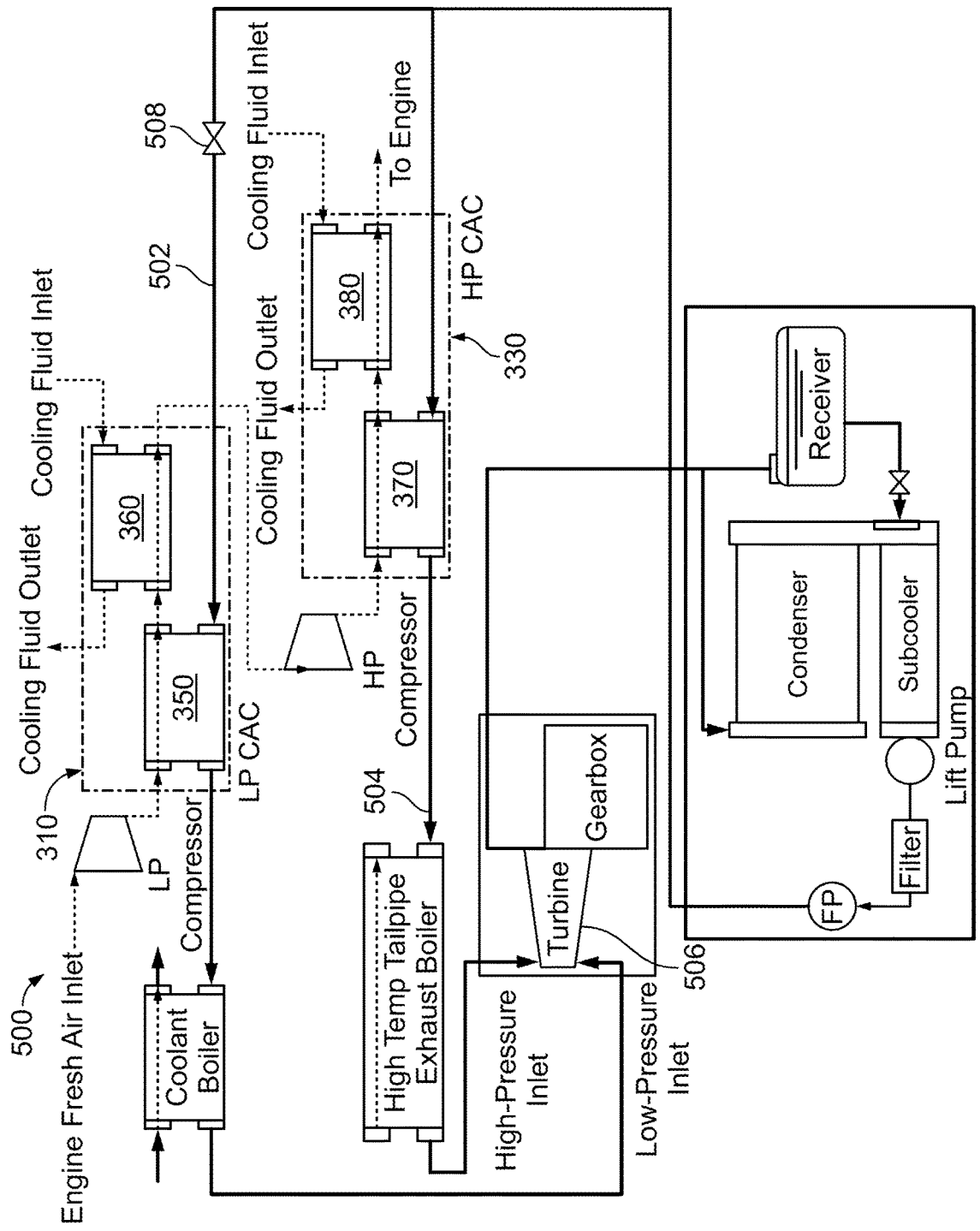
FIG. 5 is an illustration of a WHR system 500 that incorporates the two stage dual core CAC system 300 in parallel, according to a particular embodiment.

FIG. 5 is an illustration of a WHR system 500 that incorporates the two stage dual core CAC system 300 in parallel, according to a particular embodiment. As shown, the WHR system 500 includes a low pressure working fluid path 502 and a high pressure working fluid path 504. The low pressure working fluid path 502 is configured to receive heat from sources that are typically at a relatively lower temperature (e.g., fifty to one hundred fifty degrees Celsius) compared to the sources used on the high pressure working fluid path 504, and is in fluid communication with the two stage dual core CAC system 300, which is arranged in parallel. A parallel arrangement refers to the way in which the working fluid can be directed through the two stage dual core CAC system 300 (e.g., the working fluid can be directed independently through either or both of the low pressure dual core CAC 310 and the high pressure dual core CAC 330).

The low pressure dual core CAC 310 is in fluid communication with the low pressure working fluid path 502, and the high pressure dual core CAC 330 is in fluid communication with the high pressure working fluid path 504. A first valve 508 is in fluid communication with the low pressure working fluid path 502 and is operable to direct the working fluid through the low pressure working fluid path 502 or prevent the working fluid from flowing through the low pressure working fluid path 502. A second valve (not shown) may be positioned in or on the high pressure working fluid path 504 and is operable to direct the working fluid through the high pressure working fluid path 504 or prevent the working fluid from flowing through the high pressure working fluid path 504. Accordingly, based on the arrangement of the first valve 508 and the second valve, the working fluid can be directed through one or both of the first WHR core 350 and the second WHR core 370, or the working fluid can be prevented from flowing through both of the first WHR core 350 and the second WHR core 370.

The decision as to how much working fluid is allowed through either, neither, or both of the first WHR core 350 and the second WHR core 370 may be based on the temperature of the charge air as it exits the high pressure dual core CAC 330. For example, in some embodiments the working fluid may be flowing through both the first WHR core 350 and the second WHR core 370. The temperature of the charge air as it exits the high pressure dual core CAC 330 may be lower than the target intake temperature. In such instances, one or both of the first valve 508 and the second valve may be operated to prevent the working fluid from flowing through one or both of the first WHR core 350 and the second WHR core 370 to increase the temperature of the charge air as it exits the high pressure dual core CAC 330. As another example, in some embodiments the working fluid may be flowing through only the second WHR core 370 (e.g., the first valve 508 is closed to prevent the working fluid from flowing through the first WHR core 350). The temperature of the charge air as it exits the high pressure dual core CAC 330 may be higher than the target intake temperature. In this example embodiment, the first valve 508 may be opened to allow the working fluid to flow through the first WHR core 350 to decrease the temperature of the charge air exiting the high pressure dual core CAC 330 to the target intake temperature.

The working fluid from the low pressure working fluid path 502 and the working fluid from the high pressure working fluid path 504 are both directed to a dual inlet turbine 506. The dual inlet turbine includes a first inlet in fluid communication with the low pressure working fluid path 502 and a second inlet in fluid communication with the high pressure working fluid path 504. The dual inlet turbine 506 is configured to receive both low pressure working fluid and high pressure working fluid and covert the thermal energy of those working fluids to mechanical work.

IV. Triple Core CAC System

Figure 6:
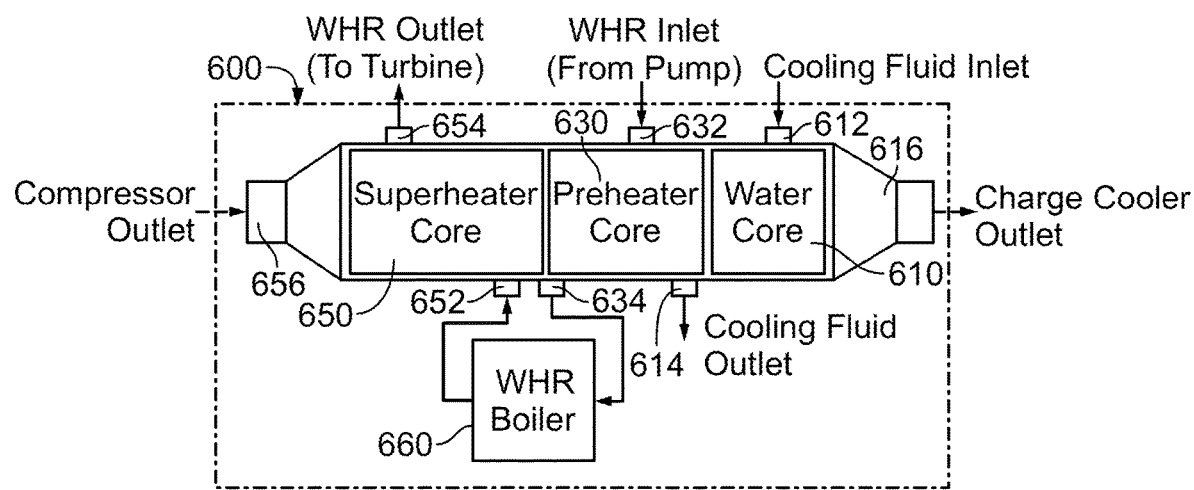
FIGS. 6-7 are illustrations of a triple-core CAC and a WHR system incorporating the triple-core CAC, according to a particular embodiment.
Figure 7:
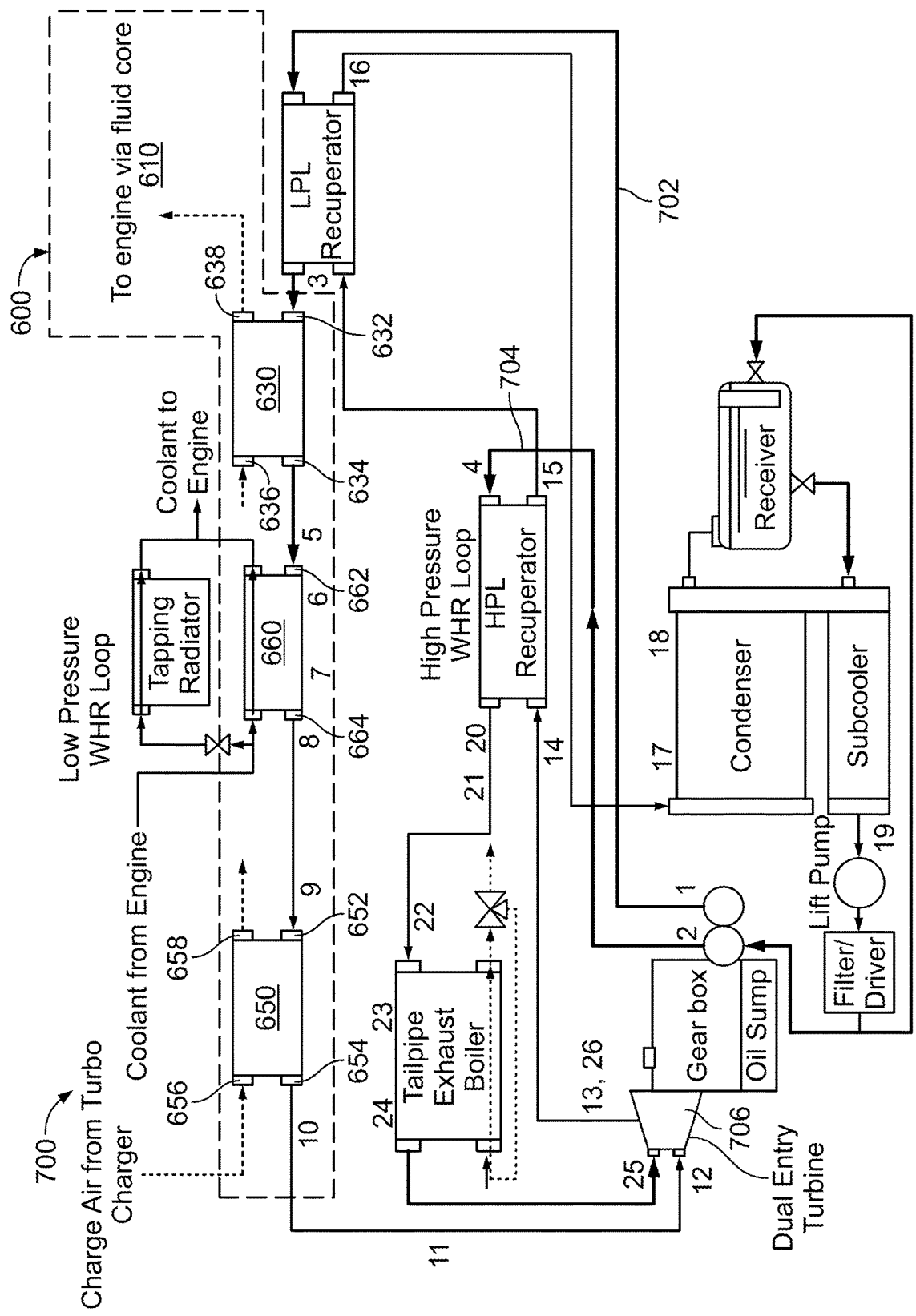

FIGS. 6-7 are illustrations of a triple core CAC system 600 and a WHR system 700 incorporating the triple core CAC system 600, respectively, according to a particular embodiment. As shown, the triple core CAC system 600 includes a cooling fluid core 610, a preheater core 630, a superheater core 650, and a WHR boiler 660.

The cooling fluid core 610 includes a cooling fluid inlet 612 coupled to a cooling fluid outlet 614 via a cooling fluid conduit (not shown). The cooling fluid inlet 612 is in fluid communication with a cooling fluid source that provides cooling fluid (e.g., water, coolant, refrigerant, etc.) to the cooling fluid inlet 612. The cooling fluid core 610 also includes a third air inlet (not shown) coupled to a third air outlet 616 by a third air conduit, where the third air outlet 616 is in fluid communication with an intake of the engine (or, in some embodiments, to the intake via further compression stages). In some embodiments, the cooling fluid conduit and the third air conduit are adjacent to each other such that at least some heat from the charge air is absorbed by the cooling fluid, thereby decreasing the temperature of the charge air and increasing the temperature of the cooling fluid.

The preheater core 630 includes a first working fluid inlet 632 coupled to a first working fluid outlet 634 via a first working fluid conduit (not shown). The first working fluid inlet 632 is in fluid communication with a low pressure working fluid path 702 such that the working fluid in the low pressure working fluid path 702 is directed to the first working fluid inlet 632. The preheater core 630 also includes a second air inlet (not shown) coupled to a second air outlet (not shown) by a second air conduit, where the second air outlet is in fluid communication with the third air inlet. In some embodiments, the first working fluid conduit and the second air conduit are adjacent to each other such that at least some heat from the charge air is absorbed by the working fluid, thereby decreasing the temperature of the charge air and increasing the temperature of the working fluid.

The superheater core 650 includes a second working fluid inlet 652 coupled to a second working fluid outlet 654 via a second working fluid conduit (not shown), where the second working fluid inlet 652 is in fluid communication with the first working fluid outlet 634. The superheater core 650 also includes a first air inlet 656 and a first air outlet (not shown) coupled to the first air inlet 656 via a first air conduit, where the first air outlet is in fluid communication with the second air inlet. The first air inlet 656 is configured to receive charge air from a compressor of a turbocharger. In some arrangements, the second working fluid conduit and the first air conduit are adjacent to each other such that at least some heat from the charge air is absorbed by the working fluid, thereby decreasing the temperature of the charge air and increasing the temperature of the working fluid.

The WHR boiler 660 is positioned between the first working fluid outlet 634 and the second working fluid inlet 652 and is configured to heat the working fluid, partially or completely boiling the working fluid.

In operation, the triple core CAC system 600 is configured to receive charge air from a turbocharger at the first air inlet 656, where the charge air is at an elevated temperature (e.g., approximately 300-350 degrees Fahrenheit). The triple core CAC system 600 is also configured to receive a working fluid from the low pressure working fluid path 702 at a low temperature (e.g., approximately 40-60 degrees Fahrenheit) at the first working fluid inlet 632 and cooling fluid at a low temperature (e.g., approximately 40-60 degrees Fahrenheit) at the cooling fluid inlet 612.

As the charge air flows through the first air conduit, the second air conduit, and the third air conduit, the temperature of the charge air decreases as the temperature of the cooling fluid in the cooling fluid conduit and the working fluid in the first working fluid conduit and the second working fluid conduit increases. At the third air outlet 616, the temperature of the air reaches approximately the target intake temperature and is provided to the intake manifold (or, in some embodiments, to the intake manifold via further compression stages, or a compressor inlet).

In this example embodiment, the WHR boiler 660 is used to heat the working fluid before the working fluid enters the superheater core 650. Heating the working fluid as described allows the charge air to cool as it flows through the superheater core 650, and increases the thermal energy of the working fluid as heat from the charge air is transferred from the working fluid. Increasing the thermal energy of the working fluid as described provides for efficient waste heat recovery and provides for more mechanical power from the WHR system 700 than if the WHR boiler 660 was not used.

The WHR system 700 includes the low pressure working fluid path 702 and a high pressure working fluid path 704, where the triple core CAC system 600 is positioned along the low pressure working fluid path 702. The working fluid from the low pressure working fluid path 702 is directed from the triple core CAC system 600 to a dual inlet turbine 706. The dual inlet turbine 706 is configured to receive both low pressure working fluid and high pressure working fluid and convert the thermal energy of those working fluids to mechanical work.

IV. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the term "substantially," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language a "portion" is used, the item can include a portion and/or the entire item unless specifically stated to the contrary.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Although only a few embodiments have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative embodiments. Other substitutions, modifications, changes, and omissions may also be made in the design, operating conditions and arrangement of the various exemplary embodiments without departing from the scope of the present invention.

What is claimed is:

1. A waste heat recovery system for an engine system, comprising:
    a dual input turbine in fluid communication with a working fluid path of the waste heat recovery system;
    a first multi-core charge air cooler in fluid communication with the working fluid path of the waste heat recovery system, the first multi-core charge air cooler comprising:
        a first waste heat recovery core comprising a first working fluid outlet in fluid communication with a first inlet of the dual input turbine; and
        a first cooling fluid core comprising:
            a first cooling fluid inlet in fluid communication with a first cooling fluid path;
            a first cooling fluid conduit fluidly coupled to the first cooling fluid inlet and a first cooling fluid outlet, the first cooling fluid conduit configured to direct cooling fluid from the first cooling fluid inlet to the first cooling fluid outlet; and
            an air conduit adjacent to the first cooling fluid conduit, the air conduit in fluid communication with an air inlet and an air outlet and configured to direct air supplied by an air source from the air inlet to the air outlet, the air outlet in fluid communication with an intake of an engine or a compressor inlet of the engine; and
    a second multi-core charge air cooler in fluid communication with the working fluid path of the waste heat recovery system, the second multi-core charge air cooler comprising:
        a second waste heat recovery core comprising a second working fluid outlet in fluid communication with the first inlet of the dual input turbine; and
        a second cooling fluid core in fluid communication with the air source.

2. The waste heat recovery system of claim 1, wherein the air conduit is configured to transfer heat from the air to a working fluid conduit, thereby decreasing a temperature of the air from a first temperature to a second temperature.

3. The waste heat recovery system of claim 2, wherein the air conduit is configured to transfer heat from the air to the first cooling fluid conduit, thereby decreasing the temperature of the air from the second temperature to a third temperature.

4. The waste heat recovery system of claim 1, wherein the first waste heat recovery core further comprises:
    a first working fluid inlet configured to receive a working fluid from the working fluid path;
    a first working fluid conduit fluidly coupled to the first working fluid inlet and the first working fluid outlet, the first working fluid conduit configured to direct the working fluid from the first working fluid inlet to the first working fluid outlet; and
    an additional air conduit adjacent to the first working fluid conduit, the additional air conduit in fluid communication with an additional air inlet and an additional air outlet and configured to direct air from the additional air inlet to the additional air outlet, the additional air inlet in fluid communication with the air source, the additional air outlet in fluid communication with the air inlet.

5. A waste heat recovery system for an engine system, comprising:

a first multi-core charge air cooler in fluid communication with a working fluid path of the waste heat recovery system, the first multi-core charge air cooler comprising:
  a first waste heat recovery core; and
  a first cooling fluid core comprising:
    a first cooling fluid inlet in fluid communication with a cooling fluid source;
    a first cooling fluid conduit fluidly coupled to the first cooling fluid inlet and a first cooling fluid outlet, the first cooling fluid conduit configured to direct cooling fluid from the first cooling fluid inlet to the first cooling fluid outlet; and
    an air conduit adjacent to the first cooling fluid conduit, the air conduit in fluid communication with an air inlet and an air outlet and configured to direct air supplied by an air source from the inlet to the air outlet, the air outlet in fluid communication with an intake of an engine or a compressor inlet of the engine; and
a second multi-core charge air cooler in fluid communication with the working fluid path, the second multi-core charge air cooler comprising:
  a second waste heat recovery core comprising:
    a working fluid inlet configured to receive working fluid from the first working fluid outlet;
    a working fluid conduit fluidly coupled to the working fluid inlet; and
    a second air conduit adjacent to the working fluid conduit and in fluid communication with the air outlet; and
  a second cooling fluid core comprising:
    a second cooling fluid inlet in fluid communication with the first cooling fluid outlet;
    a second cooling fluid conduit fluidly coupled to the second cooling fluid inlet and a second cooling fluid outlet, the second cooling fluid conduit configured to direct the cooling fluid from the second cooling fluid inlet to the second cooling fluid outlet; and
    a third air conduit adjacent to the second cooling fluid conduit and in fluid communication with the second air conduit and with the intake of the engine.

6. The waste heat recovery system of claim 5, further comprising:
  a low pressure working fluid path, the second multi-core charge air cooler positioned within the low pressure working fluid path;
  a high pressure working fluid path; and
  a dual input turbine configured to receive the working fluid from the low pressure working fluid path and the high pressure working fluid path.

7. The waste heat recovery system of claim 5, wherein the working fluid conduit is fluidly coupled with a second working fluid outlet, the working fluid conduit configured to direct the working fluid from the working fluid inlet to the second working fluid outlet.

8. The waste heat recovery system of claim 5, wherein the second air conduit is in fluid communication with a second air inlet and a second air outlet and configured to direct the air from the second air inlet to the second air outlet, the second air inlet in fluid communication with the air outlet.

9. The waste heat recovery system of claim 8, wherein the third air conduit is in fluid communication with a third air inlet and a third air outlet and configured to direct the air from the third air inlet to the third air outlet, the third air inlet in fluid communication with the second air outlet, the third air outlet in fluid communication with the intake of the engine.

10. A waste heat recovery system for an engine system, comprising:
  a first multi-core charge air cooler in fluid communication with a working fluid path of the waste heat recovery system, the first multi-core charge air cooler comprising:
    a first waste heat recovery core; and
    a first cooling fluid core comprising:
      a first cooling fluid inlet in fluid communication with a cooling fluid source;
      a first cooling fluid conduit fluidly coupled to the first cooling fluid inlet and a first cooling fluid outlet, the first cooling fluid conduit configured to direct cooling fluid from the first cooling fluid inlet to the first cooling fluid outlet; and
      an air conduit adjacent to the first cooling fluid conduit, the air conduit in fluid communication with an air inlet and an air outlet and configured to direct air supplied by an air source from the inlet to the air outlet, the air outlet in fluid communication with an intake of an engine or a compressor inlet of the engine,
  wherein the first multi-core charge air cooler is in fluid communication with a low pressure working fluid path, the waste heat recovery system further comprising:
  a second multi-core charge air cooler in fluid communication with a high pressure working fluid path, the second multi-core charge air cooler comprising:
    a second waste heat recovery core comprising:
      a working fluid inlet configured to receive working fluid from the high pressure working fluid path;
      a working fluid conduit; and
      a second air conduit adjacent to the working fluid conduit and in fluid communication with the air outlet; and
    a second cooling fluid core comprising:
      a second cooling fluid inlet in fluid communication with the cooling fluid source;
      a second cooling fluid conduit fluidly coupled to the second cooling fluid inlet; and
      a third air conduit adjacent to the second cooling fluid conduit and in fluid communication with the second air conduit and with the intake of the engine.

11. The waste heat recovery system of claim 10, further comprising a dual input turbine configured to receive the working fluid from the low pressure working fluid path and the high pressure working fluid path.

12. The waste heat recovery system of claim 10, wherein the working fluid conduit is fluidly coupled to the working fluid inlet and the working fluid outlet, the working fluid conduit configured to direct the working fluid from the working fluid inlet to the working fluid outlet.

13. The waste heat recovery system of claim 10, wherein the second air conduit is in fluid communication with a second air inlet and a second air outlet and is configured to direct the air from the second air inlet to the second air outlet, the second air inlet in fluid communication with the air outlet.

14. The waste heat recovery system of claim 13, wherein the third air conduit is in fluid communication with a third air inlet and a third air outlet and configured to direct the air from the third air inlet to the third air outlet, the third air inlet in fluid communication with the second air outlet, the third air outlet in fluid communication with the intake of the engine.

15. The waste heat recovery system of claim 10, wherein the second cooling fluid conduit is fluidly coupled to the second cooling fluid inlet and a second cooling fluid outlet, the second cooling fluid conduit configured to direct the cooling fluid from the second cooling fluid inlet to the second cooling fluid outlet.

16. An engine system, comprising:
   a waste heat recovery system, comprising:
      a first multi-core charge air cooler in fluid communication with a first working fluid path, a first cooling fluid path, and an air source, the first multi-core charge air cooler comprising at least a first waste heat recovery core and a first cooling fluid core;
      a second multi-core charge air cooler in fluid communication with a second working fluid path, a second cooling fluid path, and the air source, the second multi-core charge air cooler comprising at least a second waste heat recovery core and a second cooling fluid core; and
      a first flow control valve selectively directing a portion of a working fluid through the first working fluid path and a remainder of the working fluid through the second working fluid path.

17. The engine system of claim 16, further comprising a second flow control valve, the second flow control valve selectively directing a cooling fluid through the first cooling fluid path.

18. The engine system of claim 17, further comprising a third flow control valve, the third flow control valve selectively directing the cooling fluid through the second cooling fluid path.

19. The engine system of claim 16, further comprising:
   a first air conduit extending from a first air inlet of the first multi-core charge air cooler to a first air outlet of the first multi-core charge air cooler; and
   a low pressure compressor in fluid communication with the air source and the first air conduit.

20. The engine system of claim 19, further comprising:
   a second air conduit extending from a second air inlet of the second multi-core charge air cooler to a second air outlet of the second multi-core charge air cooler; and
   a high pressure compressor in fluid communication with the first air outlet and the second air inlet.

21. The engine system of claim 16, wherein the first working fluid path comprises a low pressure working fluid and the second working fluid path comprises a high pressure working fluid.

22. The engine system of claim 21, further comprising a dual inlet turbine in fluid communication with the first working fluid path and the second working fluid path, the dual inlet turbine configured to receive the low pressure working fluid and the high pressure working fluid.

23. The engine system of claim 16, further comprising an additional valve in fluid communication with the second working fluid path, the additional valve configured to selectively direct a portion of the working fluid through the second working fluid path.

24. A waste heat recovery system for an engine system, comprising:
   a first multi-core charge air cooler comprising at least a first waste heat recovery core and a first cooling fluid core in fluid communication with a working fluid path and a source of compressed air, the first multi-core charge air cooler configured to direct the compressed air from a first air inlet to a first air outlet and to direct a working fluid from a first working fluid inlet to a first working fluid outlet;
   a second multi-core charge air cooler comprising at least a second waste heat recovery core and a second cooling fluid core in fluid communication with the working fluid path and the source of compressed air, the second multi-core charge air cooler configured to direct the compressed air from a second air inlet to a second air outlet and to direct the working fluid from a second working fluid inlet to a second working fluid outlet, the second air inlet in fluid communication with the first air outlet and the second working fluid inlet in fluid communication with the first working fluid outlet; and
   a third multi-core charge air cooler comprising at least a third waste heat recovery core and a third cooling fluid core in fluid communication with a cooling fluid path and the source of compressed air, the third multi-core charge air cooler configured to direct the compressed air from a third air inlet to a third air outlet and to direct a cooling fluid from a first cooling fluid inlet to a first cooling fluid outlet, the third air inlet in fluid communication with the second air outlet, the third air outlet in communication with an intake of the engine system.

25. The waste heat recovery system of claim 24, further comprising a boiler in fluid communication with the first multi-core charge air cooler and the second multi-core charge air cooler, the boiler configured to receive the working fluid from the second working fluid outlet and direct the working fluid to the first working fluid inlet.

26. The waste heat recovery system of claim 25, wherein the boiler partially or completely boils the working fluid before directing the working fluid to the first working fluid inlet.

27. The waste heat recovery system of claim 25, wherein the working fluid is a low pressure working fluid.

28. The waste heat recovery system of claim 27, further comprising a turbine configured to receive the low pressure working fluid and a high pressure working fluid and convert a first thermal energy of the low pressure working fluid and a second thermal energy of the high pressure working fluid to mechanical work.

* * * * *